United States Patent
Hadinata et al.

(10) Patent No.: US 8,023,964 B2
(45) Date of Patent: Sep. 20, 2011

(54) PREDICTIVE MOBILE PHONE SERVICE DISRUPTION SERVICE

(75) Inventors: Martinianus BudiTjahja Hadinata, Brunnen (CH); Charles Steven Lingafelt, Durham, NC (US); John Elbert Moore, Jr., Brownsburg, IN (US); Brian Marshall O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 12/060,463

(22) Filed: Apr. 1, 2008

(65) Prior Publication Data

US 2009/0247147 A1   Oct. 1, 2009

(51) Int. Cl.
*H04W 24/00*   (2009.01)
(52) U.S. Cl. ............ 455/456.1; 455/421; 455/440; 455/404.2
(58) Field of Classification Search ........... 455/456.1, 455/421, 404.2, 440
See application file for complete search history.

(56) References Cited

U.S. PATENT DOCUMENTS

| | | | |
|---|---|---|---|
| 6,252,544 B1 | 6/2001 | Hoffberg | |
| 6,442,393 B1 | 8/2002 | Hogan | |
| 6,625,135 B1 | 9/2003 | Johnson et al. | |
| 6,721,572 B1 * | 4/2004 | Smith et al. | 455/456.1 |
| 6,799,016 B2 | 9/2004 | Davis et al. | |
| 7,076,245 B1 | 7/2006 | Satapathy | |
| 7,136,636 B1 | 11/2006 | McLaughlin | |
| 7,292,849 B2 * | 11/2007 | Merritt | 455/421 |
| 2006/0205402 A1 * | 9/2006 | Banavar et al. | 455/426.1 |
| 2006/0229809 A1 * | 10/2006 | Chen | 701/213 |
| 2007/0211676 A1 | 9/2007 | Sharma et al. | |

* cited by examiner

*Primary Examiner* — Nimesh Patel
(74) *Attorney, Agent, or Firm* — Yee & Associates, P.C.; Mark C. Vallone

(57) ABSTRACT

Illustrative embodiments provide a computer implemented method, a data processing system and a computer program product for a predictive mobile phone service disruption service. In one illustrative embodiment, the computer implemented method comprises monitoring a cellular call of a caller, calculating a location and vector of the caller, and determining whether the caller is approaching a drop zone. The computer implemented method responsive to determining the caller is approaching a drop zone, estimates a duration of a loss of service, and responsive to determining the caller is approaching a drop zone, selectively notifying the caller.

18 Claims, 2 Drawing Sheets

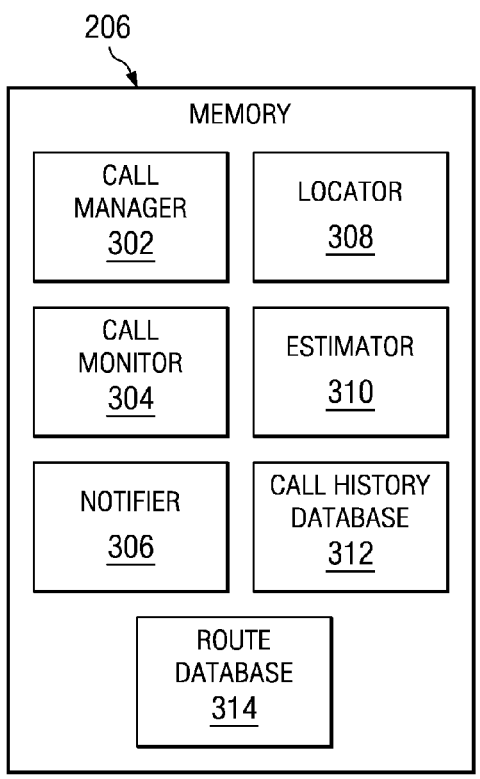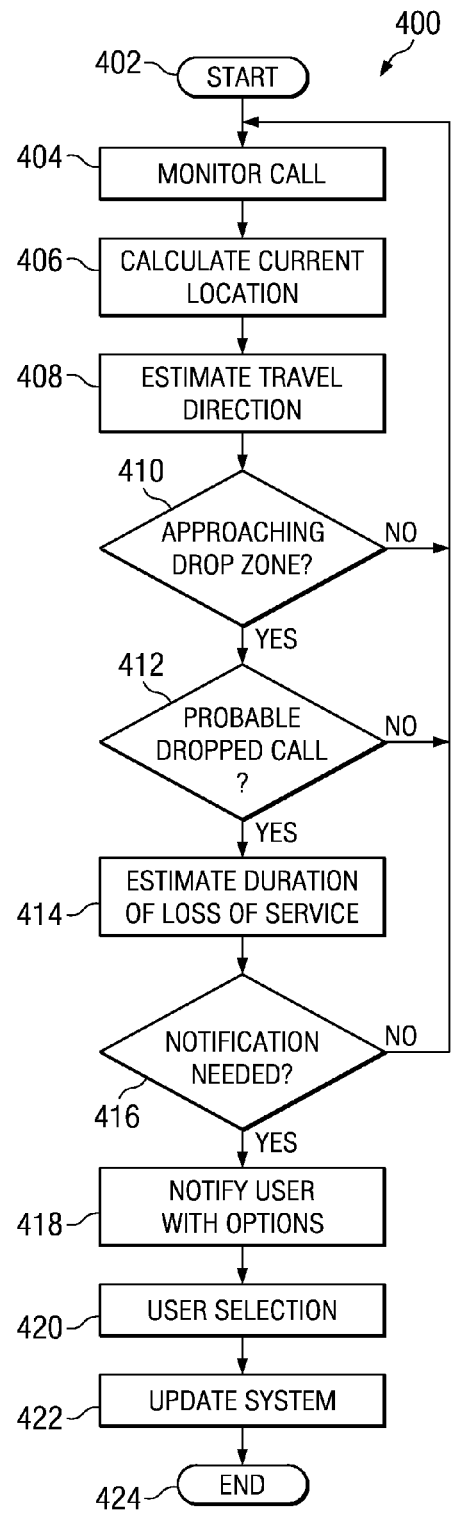

US 8,023,964 B2

PREDICTIVE MOBILE PHONE SERVICE DISRUPTION SERVICE

BACKGROUND OF THE INVENTION

1. Field of the Invention

The present invention relates generally to an improved data processing system and more specifically to a computer implemented method, an apparatus and a computer program product for a predictive mobile phone service disruption service.

2. Background Description

Cellular phone usage is an established communication mode. Many users depend upon this form of communication. As users engaged in conversations on cell phones travel, for example while in a car, bus, or train, calls among the users can be dropped. Dropped calls are typically due to encountering areas of poor cellular signal coverage, cell tower hand-offs, and other reasons. Coverage limitations may be due to geography or the presence of man made objects such as large, tall buildings. The dropping of calls typically occurs without a cellular caller's knowledge. Because the call drops without notice to the user, the user is left without an opportunity to prevent the call from being dropped.

Various methods exist that attempt to deal with the dropping of calls. For example, some methods detect when call service degrades beyond a quality threshold. In this example, the methods then take actions such as notifying the parties. However, existing solutions typically warn the user just before the call is dropped.

BRIEF SUMMARY OF THE INVENTION

Illustrative embodiments provide a computer implemented method, a data processing system and a computer program product for a predictive mobile phone service disruption service. According to one embodiment of the present invention, the computer implemented method comprises monitoring a cellular call of a caller, calculating a location and vector of the caller, and determining whether the caller is approaching a drop zone. The computer implemented method responsive to determining the caller is approaching a drop zone, estimates duration of a loss of service, and responsive to determining the caller is approaching a drop zone, selectively notifies the caller.

BRIEF DESCRIPTION OF THE SEVERAL VIEWS OF THE DRAWINGS

FIG. 3 is a block diagram of components of a predictive mobile phone service disruption service in accordance with illustrative embodiments; and FIG. 4 is a flowchart of the predictive mobile phone service disruption service example of FIG. 3, in accordance with illustrative embodiments.

DETAILED DESCRIPTION OF THE INVENTION

Figure 1:
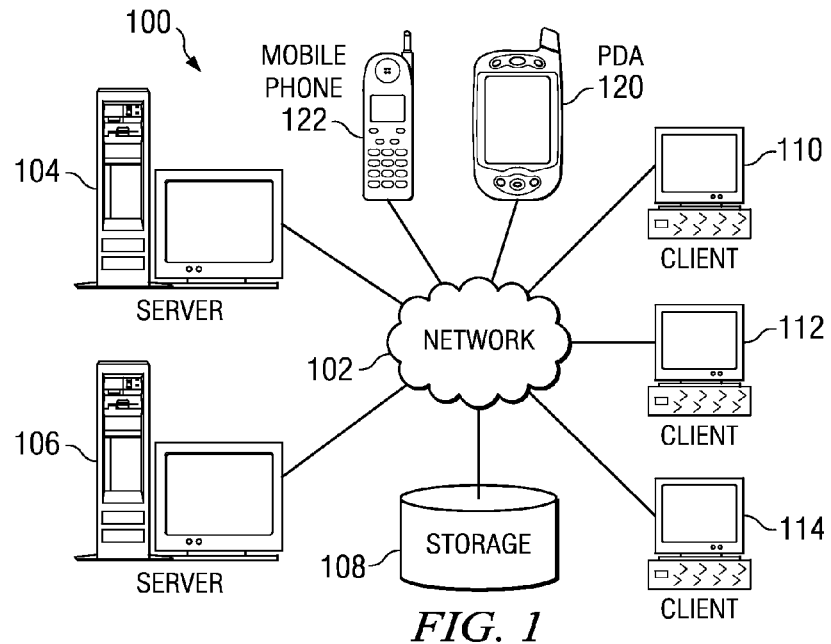
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
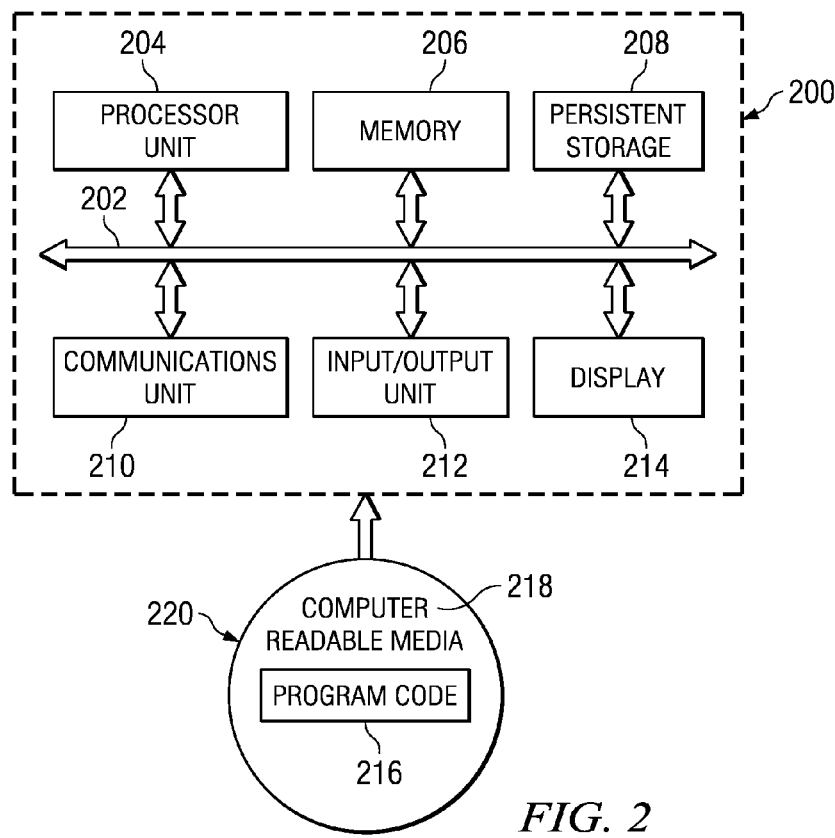
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Mobile phone 122 includes screen capable of displaying pictures and text. Additionally, mobile phone 122 also includes a numeric keypad, joystick, and buttons placed around the joystick. These buttons are used to initiate various functions in mobile phone 122. The functions include, for example, activating a menu, displaying a calendar, or initiating a call. Mobile phone 122 may also be enabled with a global positioning system chip in addition to a capability for connecting to and receiving messages from network 102.

PDA 120, a personal digital assistant, includes a display for presenting textual and graphical information. The display may be used to present a map or directions, calendar information, a telephone directory, or an electronic mail message. In these examples, the screen may receive user input using an input device such as, a stylus. PDA 120 may also include a keypad, speaker, and antenna. The keypad may be used to receive user input in addition to using the screen. The speaker provides a mechanism for audio output, such as presentation of an audio file or spoken voice. The antenna provides a mechanism used in establishing a wireless communications link between PDA 120 and a network, such as network 102 in FIG. 1.

In one example, a predictive mobile phone service disruption service may be implemented on server 104 and monitor PDA 120 and mobile phone 122 as the device moves about during use. A call history database, indicating areas of poor reception and previously dropped calls, may reside on the same server or another server such as server 106 connected through network 102. When service to mobile phone 122 is about to be disrupted, the potential disruption is detected allowing notification, including an outage duration, to be sent to the user of mobile phone 122. In response, a user may then change routes to avoid the outage or reduce the estimated duration.

Illustrative embodiments provide a capability to predict a likelihood that a cellular call may drop as a mobile user is moving near known signal trouble spots. Further capability is provided for calculating an expected outage duration and notifying the user and other parties of the expected duration of time before the call can be re-established. Further yet, the capability may, in some embodiments, offer the caller an option of an alternative route providing more reliable coverage.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices that may comprise a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference to FIG. 3, a block diagram of components of a predictive mobile phone disruption service in accordance with illustrative embodiments is shown. The components of a predictive mobile phone service disruption service are shown within a memory 206 of system 200 of FIG. 2. Elements of the components may also be contained in other areas of the system such as computer-readable media 218 and persistent storage 208 of FIG. 2 as needed.

A predictive mobile phone disruption service typically comprises a number of components in addition to those provided by the computer system in which the service is implemented. Additional components typically include call manager 302, call monitor 304, notifier 306, locator 308 estimator 310, call history database 312, and route database 314.

Call manager 302 performs an umbrella type function of managing all components of the service and may provide additional function such as administrative utilities for the service. Call monitor 304 provides a capability to monitor the connections of the various telephony devices connected to the network. Call monitor 304 is aware of signal strength, bandwidth and other quality of service indicators of the cellular system.

Notifier 306 provides a capability of making the user aware of the possible loss of service by way sending a notification to the caller. The notification may be in the form of a message, either in text or audible form, or other visual representation such as an icon or other display change to attract the user. In addition, the notifier may present the user with a set of options upon detecting an imminent outage. The set of options allowing the user to select a course of action.

Locator 308 provides a capability of determining the location of the caller within the context of the network. If the caller had made route information available to the service, the locator would also determine within the context of the route where the caller was positioned. Location may be determined using reference information provided by cellular phone system towers or cells or by other means such as global positioning system if the mobile device includes such feature.

Estimator 310 provides a capability to calculate an alternate route based on information maintained in call history database 312 and route database 314. Call history database 312 provides information such as the incidence of a dropped call and the locations of the dropped calls. In addition, the database may have other quality of service information related to performance of the network useful in indicating potential signal quality issues such as poor signal strength, and noise interference.

Route database 314 provides geographic information regarding the vehicle routing in areas covered by the network. This may be a mapping service capable of providing rich information for graphic display on the mobile phone display or may be a simple listing of roads augmented by traffic and construction delays or detours. Such information is used by estimator 310 in calculating outage duration.

The mobile phone service disruption service provides the capability to detect an imminent disruption or outage and notify the user allowing the user to take some action, as well as informing the user when the service will return. The capability is therefore provided for determining that a conversation may be dropped based on a current heading and other factors relative to a database of call history information, notifying parties in the conversation that the conversation may be disrupted, and notifying parties in the conversation, based on historical information and device trajectory, when communication may be re-established.

This capability, in an illustrative embodiment, is a 'mash-up' or integration of information, of various tools including, but not limited to, cellular towers, historical dropped call data, and/or the global positioning system location of the cellular caller to predict the probability that a cellular call will drop, estimate how long the caller will be without services, and estimate an alternate route for the cellular user to avoid or reduce the impact of the disruption.

With reference to FIG. 4, a flowchart of the predictive mobile phone disruption service example of FIG. 3, in accordance with illustrative embodiments is shown. Mobile phone service disruption service may be implemented in one example by process 400 of call manager 302 of FIG. 3.

For example process 400 begins (step 402) and monitors calls on the network (step 404). Call monitoring in this example is within a context of networking signal connection related information and not content of calls. The signal connection information comprising bandwidth, latency, noise and other factors related to call quality.

A current location of the caller is calculated or estimated based on information such as proximity to a cell tower, or by way of global positioning system information of the caller device (step 406). The calculation also provides a caller vector comprised of estimated speed and direction, providing an estimated travel direction (step 408). Location information may also comprise other factors, such as predicted direction changes due to direction path boundaries.

Predicted direction changes may be determined by querying upcoming road coordinates in a map database. Additional information may be derived from querying a known path such as determined from a global positioning system navigation unit, or reference to a user calendar, accessible on the mobile device or server, containing destinations, or other known means of predicting where a user may be heading.

Predicted speed changes due to speed-influencing factors, such as querying upcoming speed limit changes may also be estimated. Estimation may query a historical speed database, and query a database of current traffic speeds, especially those that show the influence of any weather, traffic accidents, or other impeding factors. Such information may be found in the route database or linked through the database.

A determination is made as to whether the caller is approaching a drop zone in which signal or call drop occurs (step 410). The determination is performed by comparison of the previously mentioned predictors to known trouble spots, such as areas of poor signal coverage, according to a look-up of historical call drop data with positional coordinates. The call history database provides this type of information. If the caller is approaching a drop zone, a "yes" is returned, otherwise a "no" results. If a "no" was obtained in step 410, process 400 loops back to step 404.

If a "yes" results from step 410, probable dropped call is determined, for example, based on the caller entering an area having a history of dropped calls (step 412) If there is a probable dropped call based on the information obtained, a "yes" results otherwise, a "no" results. If the result of step 412 was "no" process 400 loops back to step 404. If the result of step 412 was "yes," an estimate of the duration of the loss of service is calculated (step 414). The estimate may be calculated based on known factors of the speed and direction of travel or may be obtained from the database based on prior occurrences.

A determination is then made as to whether notification of the caller is needed (step 416). A caller may have selected to not receive notifications of disruptions, causing a "no" result, otherwise notifications would be provided and a "yes" result. If a "no" was obtained in step 416, process 400 would loop back to step 404. If a "yes" was obtained in step 416 the caller is notified with a set of options (step 418). The set of options is one or more actions that may be selected by the caller in response to the predicted disruption. Notifying the user of a predicted call drop based on current vector may include notifying other parties on the call of a predicted call drop based on current vector.

If destination is known or predicted, such as via a global positioning system navigation unit, a course change that would bypass or minimize the spotty coverage area may be suggested. Notifying any previously notified parties of an estimated time of call establishment based on predictions may also be offered. Various methods may be used to re-establish the call such as by automatic reconnect or notifying either party that they may re-dial to manually reconnect.

If the call is dropped, via logic embedded in the cell phone itself, periodic update notification to the user of estimated time to re-establish, such as via audible announcements or via a visual status bar on the cell phone may be available. This is only applicable for the user of the cell phone, and not other parties of the call. In this mode, the cell phone is disconnected from the cell tower, and therefore cannot pass data to the cell tower, which would be required in order to notify other parties.

If the call is dropped, and is not automatically re-connected or where partial service is temporarily restored, but for a time and quality insufficient for reconnecting the call, low-bandwidth data may be passed to the cell tower when it can connect, which can be used to periodically notify other parties.

For example, a notification may prompt a caller with a set of options, the ordering of which can be defined via a predetermined profile. The system can notify the cellular caller, or all call participants, that the call will be dropped in 60 seconds, or other predetermined or estimated time, at current speed and direction with a voice or audio prompt or visual indicator, such as, all the buttons on the phone light up, the phone changes color, it starts to vibrate or chime. The system tells the caller how long the caller will be without cellular service, providing an estimated duration of the outage. The system then provides the cellular user with an alternate route where the call will not be dropped, via a display on the phone, via voice prompts, or via a text message. The system then provides information to other user devices, such as an automobile heads-up display, the radio, a built-in, or after market, global positioning system of the caller.

The system analyzes the cellular user's desired action in which the cellular user may either find a place to pull-over safely, follow the new system provided directions, or decide to terminate the call (step 420). The system is then updated with the result of the user action (step 422) and terminates thereafter (step 424).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain or store the program for use by or in connection with the instruction execution system, apparatus, or device.

The medium can be an electronic, magnetic, optical, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for a predictive mobile phone service disruption service, the method comprising:
   a computer monitoring a call of a caller placed using a mobile phone;
   the computer calculating a location and a vector of the caller;
   the computer identifying a probable route of travel of a vehicle of the caller by querying road coordinates in a map database based on the location and the vector of the caller and obtaining an intended destination of the caller from a navigation unit associated with the vehicle;
   the computer determining whether the caller is approaching a drop zone by searching a database containing a plurality of instances of dropped calls and one or more locations of the plurality of instances of dropped calls and comparing the location of the caller, the vector of the caller, and the probable route of travel of the vehicle with the one or more locations of the plurality of instances of dropped calls, wherein the drop zone is a geographical area having a history of dropped calls;
   the computer, responsive to determining that the caller is approaching the drop zone, estimating a duration of a loss of service for the call of the caller associated with the drop zone based on the probable route of travel of a vehicle of the caller;
   the computer, responsive to determining that the caller is approaching the drop zone, identifying an alternative route to reach the intended destination of the caller without entering the drop zone; and
   the computer, responsive to determining that the caller is approaching the drop zone, notifying the caller of the duration of the loss of service estimate and the alternative route to reach the intended destination.

2. The method of claim 1, wherein calculating the location and the vector of the caller comprises:
   the computer estimating a travel direction of the caller; and
   the computer estimating a speed of the caller.

3. The method of claim 1, wherein determining whether the caller is approaching the drop zone comprises:
   the computer comparing data from cellular towers and a historical dropped call database with the location and the vector of the caller to identify a probability that the call will be dropped.

4. The method of claim 1 further comprising:
the computer, responsive to determining that the caller is approaching the drop zone, notifying the caller of a time that the call will be dropped if the user does not take the alternative route.

5. The method of claim 1, wherein notifying the caller comprises:
the computer providing the caller with a set of options from which the caller may select an action.

6. The method of claim 1, wherein notifying the caller comprises:
the computer determining a response of the caller and updating the system.

7. A computer system for predictive mobile phone service disruption service, the computer system comprising:
one or more processors, one or more computer-readable memories and one or more computer-readable, tangible storage devices;
program instructions, stored on at least one of the one or more computer-readable, tangible storage devices for execution by at least one of the one or more processors via at least one of the one or more computer-readable memories, to monitor a call of a caller placed using a mobile phone;
program instructions, stored on at least one of the one or more computer-readable, tangible storage devices for execution by at least one of the one or more processors via at least one of the one or more computer-readable memories, to calculate a location and a vector of the caller;
program instructions, stored on at least one of the one or more computer-readable, tangible storage devices for execution by at least one of the one or more processors via at least one of the one or more computer-readable memories, to identify a probable route of travel of a vehicle of the caller by querying road coordinates in a map database based on the location and the vector of the caller and obtaining an intended destination of the caller from a navigation unit associated with the vehicle;
program instructions, stored on at least one of the one or more computer-readable, tangible storage devices for execution by at least one of the one or more processors via at least one of the one or more computer-readable memories, to determine whether the caller is approaching a drop zone by searching a database containing a plurality of instances of dropped calls and one or more locations of the plurality of instances of dropped calls and comparing the location of the caller, the vector of the caller, and the probable route of travel of the vehicle with the one or more locations of the plurality of instances of dropped calls, wherein the drop zone is a geographical area having a history of dropped calls;
program instructions, stored on at least one of the one or more computer-readable, tangible storage devices for execution by at least one of the one or more processors via at least one of the one or more computer-readable memories, responsive to determining that the caller is approaching the drop zone, to estimate a duration of a loss of service for the call of the caller associated with the drop zone based on the probable route of travel of a vehicle of the caller; and
program instructions, stored on at least one of the one or more computer-readable, tangible storage devices for execution by at least one of the one or more processors via at least one of the one or more computer-readable memories, responsive to determining that the caller is approaching the drop zone, to notify the caller of the duration of the loss of service estimate and the alternative route to reach the intended destination.

8. The data processing system of claim 7, wherein the program instructions to calculate the location and vector of the caller estimate a travel direction of the caller and a speed of the caller.

9. The data processing system of claim 7, wherein the program instructions to determine whether the caller is approaching the drop zone compare data from cellular towers and a historical dropped call database with the location and the vector of the caller to identify a probability that the call will be dropped.

10. The data processing system of claim 7 further comprising:
program instructions, stored on at least one of the one or more computer-readable, tangible storage devices for execution by at least one of the one or more processors via at least one of the one or more computer-readable memories, responsive to determining that the caller is approaching the drop zone, to notify the caller of a time that the call will be dropped if the user does not take the alternative route.

11. The data processing system of claim 7, wherein program instructions to notify the caller provide the caller with a set of options from which the caller may select an action.

12. The data processing system of claim 7, wherein the program instructions to notify the caller determine a response of the caller and update the system.

13. A computer program product for a predictive mobile phone service disruption service, the computer program product comprising:
one or more computer-readable, tangible storage devices;
program instructions, stored on at least one of the one or more computer-readable, tangible storage devices, to monitor a call of a caller placed using a mobile phone;
program instructions, stored on at least one of the one or more computer-readable, tangible storage devices, to identify a probable route of travel of a vehicle of the caller by querying road coordinates in a map database based on the location and the vector of the caller and obtaining an intended destination of the caller from a navigation unit associated with the vehicle;
program instructions, stored on at least one of the one or more computer-readable, tangible storage devices, to monitor a location and vector of the caller;
program instructions, stored on at least one of the one or more computer-readable, tangible storage devices, to determine whether the caller is approaching a drop zone by searching a database containing a plurality of instances of dropped calls and one or more locations of the plurality of instances of dropped calls and comparing the location of the caller, the vector of the caller, and the probable route of travel of the vehicle with the one or more locations of the plurality of instances of dropped calls, wherein the drop zone is a geographical area having a history of dropped calls;
program instructions, stored on at least one of the one or more computer-readable, tangible storage devices, responsive to determining that the caller is approaching the drop zone, to estimate a duration of a loss of service for the call of the caller associated with the drop zone based on the probable route of travel of a vehicle of the caller;
program instructions, stored on at least one of the one or more computer-readable, tangible storage devices, responsive to determining that the caller is approaching the drop zone, to identify an alternative route to reach the intended destination of the caller without entering the drop zone; and program instructions, stored on at least one of the one or more computer-readable, tangible storage devices, responsive to determining that the caller is approaching the drop zone, to notify the caller of the duration of the loss of service estimate and the alternative route to reach the intended destination.

14. The computer program product of claim 13, wherein the program instructions to calculate the location and the vector of the caller estimate a travel direction of the caller and a speed of the caller.

15. The computer program product of claim 13, wherein the program instructions to determine whether the caller is approaching the drop zone compare data from cellular towers and a historical dropped call database with the location and the vector of the caller to identify a probability that the call will be dropped.

16. The computer program product of claim 13 further comprising:

program instructions, stored on at least one of the one or more computer-readable, tangible storage devices, responsive to determining that the caller is approaching the drop zone, to notify the caller of a time that the call will be dropped if the user does not take the alternative route.

17. The computer program product of claim 13, wherein the program instructions to notify the caller provide the caller with a set of options from which the caller may select an action.

18. The computer program product of claim 13, wherein the program instructions to notify the caller determine a response of the caller and update the system.

* * * * *